United States Patent
Brunswig et al.

(10) Patent No.: US 8,392,227 B2
(45) Date of Patent: Mar. 5, 2013

(54) CONSISTENCY CHECKS FOR BUSINESS PROCESS DATA USING MASTER DATA VECTORS

(75) Inventors: Frank Brunswig, Heidelberg (DE); Ulrich Roegelein, Gaiberg (DE)

(73) Assignee: SAP AG, Walldorf (DE)

( * ) Notice: Subject to any disclaimer, the term of this patent is extended or adjusted under 35 U.S.C. 154(b) by 401 days.

(21) Appl. No.: 12/648,228

(22) Filed: Dec. 28, 2009

(65) Prior Publication Data

US 2011/0161243 A1 Jun. 30, 2011
US 2012/0123962 A2 May 17, 2012

(51) Int. Cl.
*G06Q 10/00* (2006.01)
(52) U.S. Cl. .................. 705/7.11; 705/7.25; 705/7.36
(58) Field of Classification Search ......... 705/7.11–7.42
See application file for complete search history.

(56) References Cited

U.S. PATENT DOCUMENTS

| | | | |
|---|---|---|---|
| 6,785,582 B2 * | 8/2004 | Araujo ........................... | 700/106 |
| 7,454,660 B1 | 11/2008 | Kolb et al. | |
| 7,533,103 B2 | 5/2009 | Brendle et al. | |
| 7,774,463 B2 | 8/2010 | Bloching et al. | |
| 7,900,190 B2 | 3/2011 | Brunswig et al. | |
| 7,966,603 B2 | 6/2011 | Brunswig et al. | |
| 8,122,062 B2 | 2/2012 | Brendle et al. | |
| 8,135,689 B2 | 3/2012 | Said et al. | |
| 2004/0103182 A1 * | 5/2004 | Krabel et al. ................. | 709/223 |
| 2004/0138936 A1 * | 7/2004 | Johnson et al. ................. | 705/7 |
| 2004/0139104 A1 * | 7/2004 | Kuntz-Mayr et al. ..... | 707/103 R |
| 2004/0220937 A1 * | 11/2004 | Bickford et al. .............. | 707/100 |
| 2005/0010504 A1 * | 1/2005 | Gebhard et al. ................. | 705/34 |
| 2005/0171801 A1 * | 8/2005 | Hartman ........................... | 705/1 |
| 2005/0262188 A1 * | 11/2005 | Mamou et al. ................. | 709/203 |
| 2008/0059563 A1 * | 3/2008 | Bachmann et al. ........... | 709/203 |
| 2008/0201358 A1 * | 8/2008 | Calusinski ..................... | 707/102 |
| 2009/0287868 A1 * | 11/2009 | Lee ................................. | 710/110 |
| 2009/0326988 A1 * | 12/2009 | Barth et al. ......................... | 705/4 |
| 2010/0030732 A1 * | 2/2010 | Gschwind et al. ................. | 707/2 |

OTHER PUBLICATIONS

"Evaluation Criteria for a Master Data Management Solution" (2007) Stratature, Inc.*
Wikipedia for Vector Space, last modified on Mar. 20, 2009, retrieved from the Internet: <http://web.archive.org/web/20090320000616/http://en.wikipedia.org/wiki/Vector_space>.
Wikipedia for Vector Space Model, last modified on Oct. 28, 2009, retrieved from the Internet: <http://web.archive.org/web/20091028012937/http://en.wikipedia.org/wiki/Vector_space_model>.
Wikipedia for Business Process1, last modified on Nov. 20, 2009, retrieved from the Internet: <http://web.archive.org/web/20091120052441/http://en.wikipedia.org/wiki/Business_process>.

* cited by examiner

*Primary Examiner* — Lynda Jasmin
*Assistant Examiner* — Sujay Koneru
(74) *Attorney, Agent, or Firm* — Mintz, Levin, Cohn, Ferris, Glovsky and Popeo, P.C.

(57) ABSTRACT

A business process master data vector for a business process of an organization can include master data coordinates corresponding to a plurality of business object node fields of a plurality of business objects involved in the business process. Values of the master data coordinates can indicate whether a corresponding business object node field is mandatory for successful execution of the business process. Master data instance vectors corresponding to the plurality of business objects can be evaluated such that a master data instance vector includes instance coordinates indicating whether a corresponding business object node field contains a master data value. The business process can be analyzed using the business process master data vector and/or the master data instance vectors. Related systems, processes, and articles of manufacture are also described.

18 Claims, 4 Drawing Sheets ical Field

The subject matter described herein relates to consistency, completeness, accuracy, quality, or the like of business process data, including but not limited to master data used in business processes.

BACKGROUND

Master data, sometimes referred to as reference data, can include information important for the operation of an organization, such as a company, enterprise, or the like. Master data can include persistent business information such as customer lists, data about customers (for example addresses, e-mail addresses, phone numbers, etc.), products and services, employees, materials, suppliers, and the like, which can in many examples be non-transactional in nature. Master data can support transactional processes and operations, analytics, reporting, and reporting, but is not limited to such applications. Master data of an organization can be used by several functional groups and stored in different data systems across an organization. In short, master data are generally persistent, non-transactional data that define a business entity for which there is, or should be, an agreed upon view across the organization.

One concern in the use of master data is avoiding use within the organization of multiple, potentially inconsistent, versions of the same master data in different parts of its operations. As an illustrative example, an organization such as a bank would prefer to avoid sending additional mortgage solicitations to a customer who has already taken out a mortgage from the bank. Doing so might irritate the customer or lead to the perception that the bank is not well organized. Maintaining accurate and consistent master data across an organization can assist in avoiding such a scenario. Other potential master data problems can include issues with the quality of data, consistent classification and identification of data, and data-reconciliation issues.

Many business processes require master data for successful execution. A business process or business method can be a collection of related, structured activities or tasks that produce a specific service or product, serve a particular goal for a particular customer or customers, or otherwise relate to operation of one or more functions of an organization. A business process can generally be visualized with a flowchart as a sequence of activities. A business process can be decomposed into several sub-processes having their own attributes, but which also contribute to achieving the goal of the overall business process. Analysis of business processes typically includes the mapping of processes and sub-processes down to an activity level. To maximize efficiency and customer satisfaction, business processes should include as few unnecessary activities as possible. The outcome of a well designed business process is increased effectiveness, for example improved value for the customer, and increased efficiency, for example due to reduced costs for the organization.

Unlike other types of more transient data, such as for example document data, master data is typically reused in many documents and generally changes with a relatively lower frequency. However, it can be difficult to assess the quality of master data used in business processes across a number of interconnected systems in an organization or other enterprise. In many business applications, master data is structured in business objects such as customer business objects, material business objects, and the like. Business objects typically include nodes with a parent-child association that can be referred to as the composition. Nodes can be are characterized by one or more elements such as attributes, data, and the like. Each business object node can contain a data structure with fields. These fields are master data fields for master data business objects. In addition, business object nodes can have other kind of associations, for example intra-business object and cross-business object associations. Business object nodes can also have actions and queries.

SUMMARY

Execution of a business process of an organization can involve a set of business objects. In various implementations of the current subject matter, the business process can be characterized by a business process master data vector of a master data vector space, and each master data business object can be characterized by an instance vectors of the master data vector space. The business process master data vector can include master data coordinates with a one-to-one correspondence to the business object node fields of the business objects involved in the business process. Each master data coordinate can indicate whether the corresponding business object node field is mandatory or otherwise required for successful execution of the business process. The instance vector for each business object indicates the status of the master data in the business object node fields. Among other possible advantages, and as discussed in greater detail below, comparison of the instance vectors with the business process master data vector can be used to quickly determine what fraction or portion of the business subjects associated with a business process contain sufficiently consistent master to successfully execute the business process.

In one aspect, a computer-implemented method includes defining a business process master data vector for a specific business process of an organization. The business process master data vector includes master data coordinates corresponding to business object node fields of a plurality of business objects involved in the business process. A value is assigned to each master data coordinate to indicate whether its corresponding business object node field is mandatory for successful execution of the business process. A plurality of master data instance vectors corresponding to the plurality of business objects are evaluated. Each master data instance vector includes instance coordinates corresponding to the business object node fields in a corresponding business object of the plurality of business objects and to the master data coordinates in the business process master data vector. Each instance coordinate indicates whether its corresponding business object node field contains a master data value. The business process is analyzed using the master data instance vectors and/or the business process master data vector.

In some variations one or more of the following can optionally be included. The analyzing the business process can include assessing master data consistency for the business process by determining that a fraction of the plurality of business objects contain sufficient master data to run the business process. The determining of the fraction can include comparing the master data instance vectors with the business process master data vector to identify a first number, $N_{match}$, of master data instance vectors having instance coordinates matching the master data coordinates indicating mandatory master data, and calculating the master data consistency for the business process. A feedback indicator can be provided to a user, for example via a user interface, if the master data consistency for the business process is less than a predetermined consistency threshold. The business process can be executed only if the master data consistency for the business process is greater than a predetermined consistency threshold. The method can further include receiving, via a user interface, an update to master data in the plurality of business objects and providing feedback via the user interface in real time to indicate how the update affects the master data consistency for the business process. The analyzing of the business process can include determining a scalar product between the business process master data vector, $\vec{m}(bp_1)$, of the business process and a second business process master data vector, $\vec{m}(bp_2)$, of a second business process. The scalar product, $|s|^2$, can be calculated in accordance with $|s|^2=|\vec{m}(bp_1)|\cdot|\vec{m}(bp_{21})|\cdot\cos\alpha$ wherein $\alpha$ is an angle between the business process master data vector and the second business process master data vector. A similarity metric equal to $\cos\alpha$ can be calculated to reflects a similarity between the business process and the second business process.

Alternatively or in addition, the method can include evaluating, for each second business process of the organization, a second plurality of master data instance vectors corresponding to a second plurality of business objects involved in the second business process. Each second master data instance vector can include second instance coordinates corresponding to second business object node fields in a corresponding second business object of the second plurality of business objects and to second master data coordinates in a second business process master data vector. Each second instance coordinate can indicate whether its corresponding second business object node field contains a second master data value. Master data consistency can be assessed for the second business process by determining that a second fraction of the second plurality of business objects contain sufficient master data to run the second business process. A metric indicating a total fraction of the business processes of the organization have sufficient master data consistency to be executed can be calculated.

Articles are also described that comprise a tangibly embodied machine-readable medium that stores instructions. When executed by at least one processor or machine (for example a programmable computer), these instructions cause the at least one processor to perform operations such as those described herein. Similarly, computer systems are also described that may include a processor and a memory coupled to the processor. The memory may include a program or programs that cause the processor to perform at least one of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
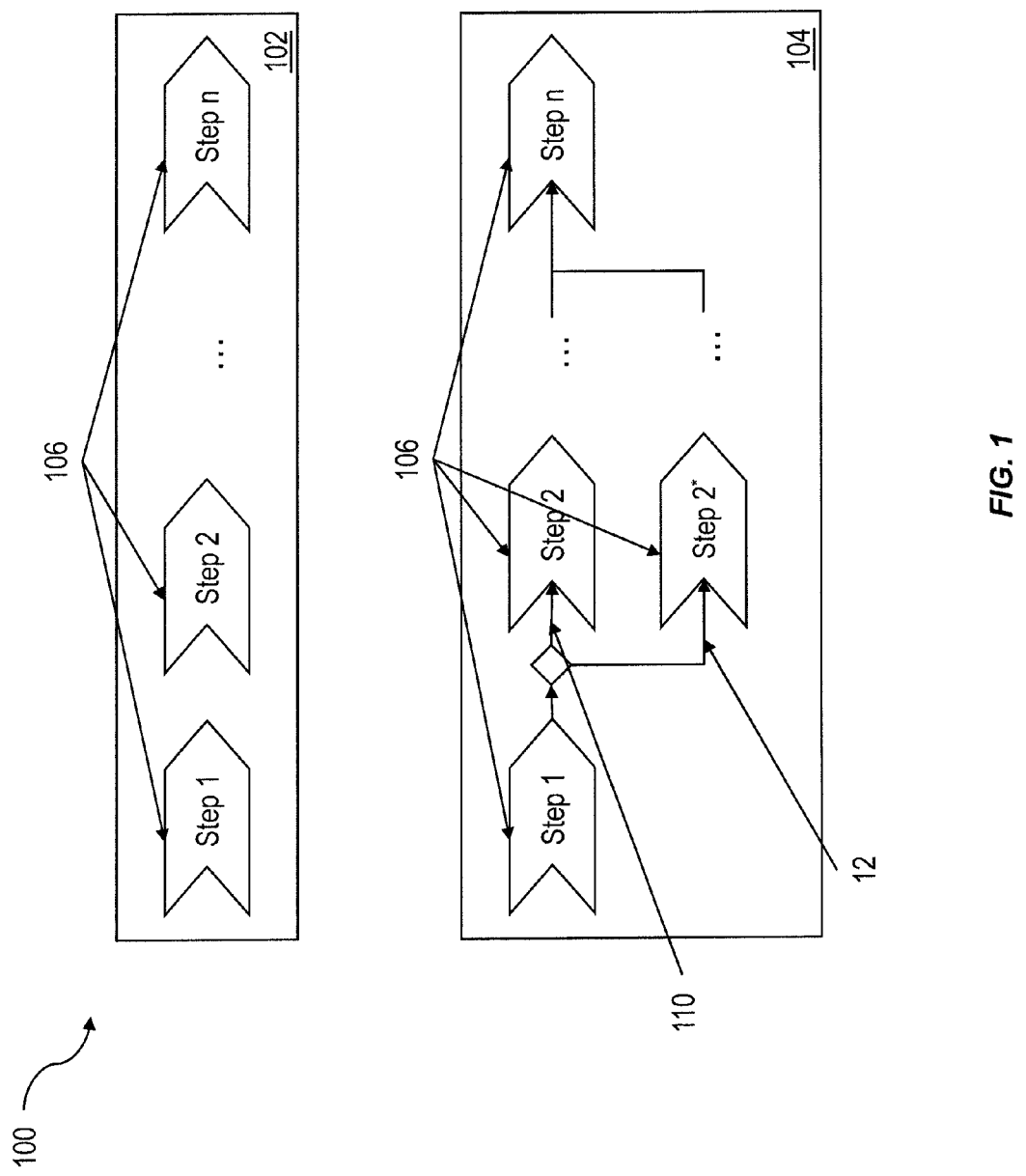
FIG. 1 is a diagram illustrating simple and complex business processes.
Figure 2:
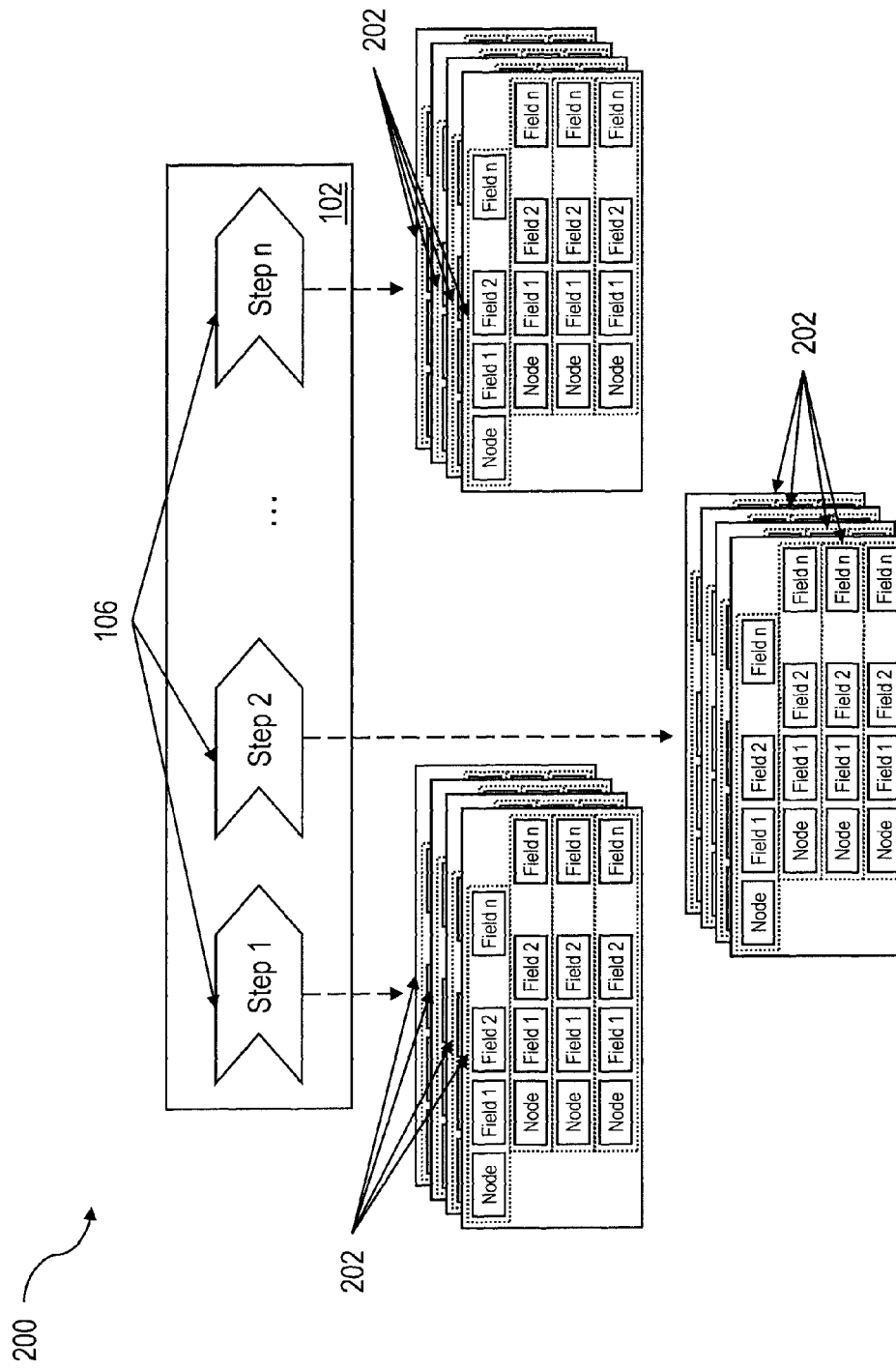
FIG. 2 is a diagram illustrating involvement of business objects in a business process.

An organization can have a defined set of business processes that are executed to perform various functions of the organization. As shown in the diagrams 100 and 200 of FIG. 1 and FIG. 2, respectively, business processes of an organization can include relatively simple business process 102 and more complex business processes 104. Each business process generally includes a sequence of actions or steps 104. Each action or step 106 can involve one or more business objects 202. A complex business process 104 can include conditions which can lead to one or more concurrently running subprocesses 110 and 112. A business object 202 can generally include an object in an object-oriented computer program that represents an entity in the domain of the organization that the computer program supports. In one example, an order entry program might include business objects that represent orders, line items, invoices, customer contact information, customer payment account information, and the like. Business objects 202 required by the actions or steps 106 of a business process 102 or 104 can include master data business objects, which, as noted above, include relatively persistent, slowly changing data that can be used across an organization and in numerous business processes.

With knowledge of the business objects used in each business process, additional meta-data can be defined for each business object node field to indicate whether each field is mandatory for a business process. This additional business process metadata can be stored in a meta-data repository. Generally, if a field is required to run a business process successfully it is a mandatory field for that business process. One or more fields, and typically many fields, can be mandatory for a given business process.

Figure 3:
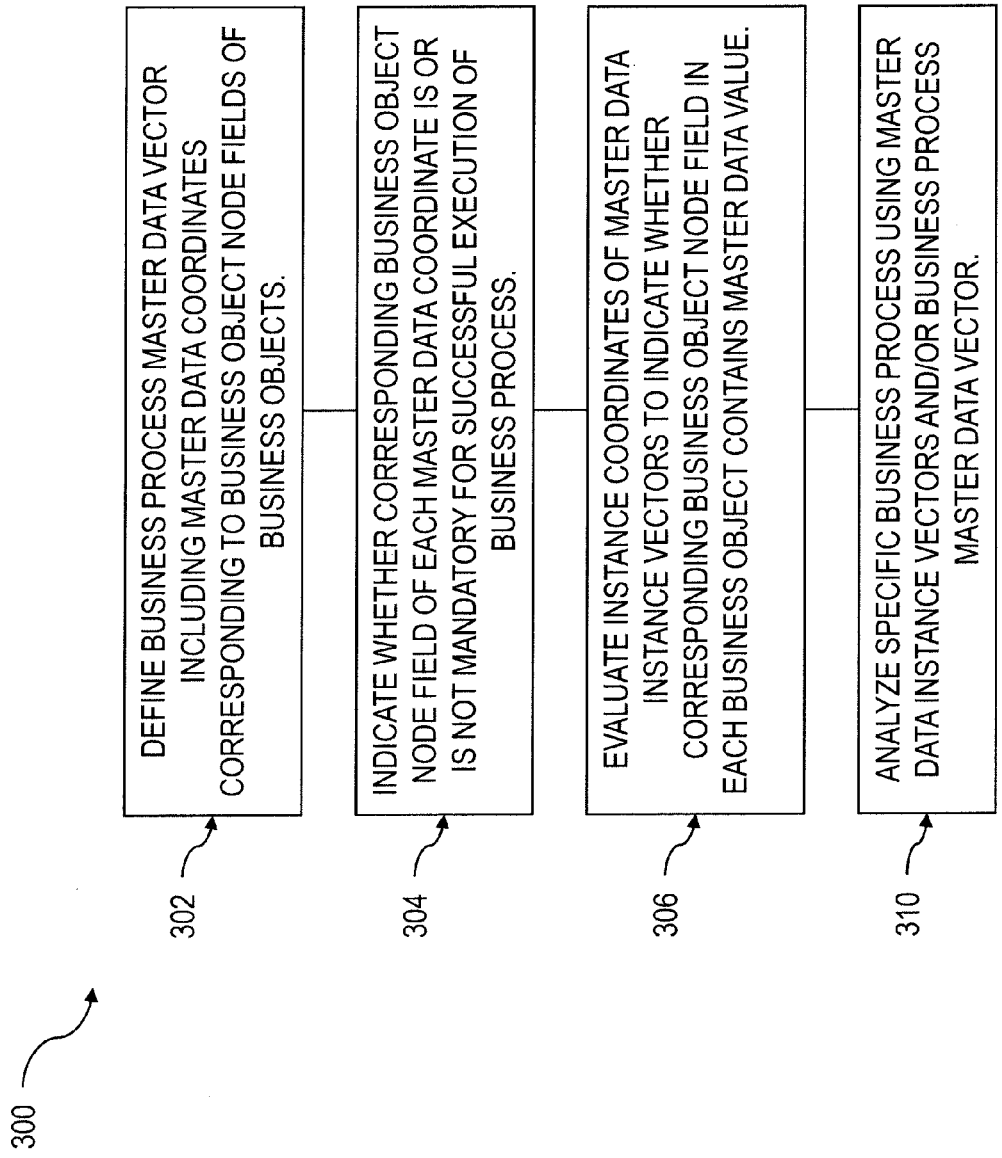
FIG. 3 is a process flow diagram illustrating a method.

One implementation of the current subject matter is illustrated in the process flow chart 300 of FIG. 3. At 302, a business process master data vector for a business process of an organization is defined. The business process master data vector can be part of a master data vector space that is defined for the organization and that includes business process master data vectors for all of the business processes of the organization. Alternatively, the master data vector space can include master data vectors representing a subset of the business processes of the organization, for example for a given work group or division of the organization.

The master data vector space can be a vector space—a mathematical structure formed by a collection of vectors. Vector spaces are characterized by their dimension, which, roughly speaking, specifies the number of independent directions in the space. The vectors are objects that can be added together and multiplied ("scaled") by numbers, called scalars in this context. Scalars can be real numbers, but one may also consider vector spaces with scalar multiplication by complex numbers, rational numbers, or even more general fields instead. The operations of vector addition and scalar multiplication have to satisfy certain requirements, called axioms, listed below. An example of a vector space is that of Euclidean vectors which are often used to represent physical quantities such as forces: any two forces (of the same type) can be added to yield a third, and the multiplication of a force vector by a real factor is another force vector. In the same vein, but in more geometric parlance, vectors representing displacements in the plane or in three-dimensional space also form vector spaces.

The business process master data vector includes master data coordinates that correspond to a plurality of business object node fields of a plurality of business objects involved in the business process. For example, a business process that involves business objects of a given type can have a master data vector that includes a coordinate for each business object node field that occurs in that business object type. Symbolically, a master data vector, $\vec{m}_i(bp_i)$, for a given business process, $bp_i$, can be expressed as:

$$\vec{m}_i(bp_i) = (c_1, c_2, c_3, \ldots, c_k) \quad (1)$$

where the $c_1, c_2, c_3, \ldots, c_k$ are master data coordinates corresponding to the business object node fields of the business subjects involved in the business process.

At 304, a value is assigned to each master data coordinate to indicate whether the business object node field to the master data coordinate is mandatory for successful execution of the business process. In one implementation, the master data coordinates can be binary, for example having values of 0 or 1 where 1 indicates a mandatory business object node field and 0 indicates a non-mandatory business object node field for business process $bp_i$. In this example, the master data vector, $\vec{m}_i(bp_i)$, can have coordinate values as follows:

$$\vec{m}_i(bp_i) = (0,1,0,0,1,\ldots,1,0) \quad (2)$$

to indicate that the first, third, fourth, and $k^{th}$ business object node fields are non-mandatory and the second, fifth, and $k^{th}-1$ business object node fields are mandatory. In a further example, a business process, $bp_1$ uses only customer business objects each having only a root node with three fields: "customer root-UUID," "customer root category code," and "customer root status" that are assigned to coordinates $c_1$, $c_2$, and $c_3$, respectively. If only the "customer root category code" and "customer root status" fields are mandatory for the business process $bp_1$, the master data vector, $\vec{m}_1(bp_1)$, for the business process is as follows:

$$\vec{m}_1(bp_1) = (0,1,1) \quad (3)$$

At 306, a plurality of master data instance vectors corresponding to the plurality of business objects are evaluated. Each master data instance vector corresponds to a business object used in the business process and includes instance coordinates that correspond to the business object node fields in the corresponding business object. The instance coordinates also correspond to the master data coordinates in the business process master data vector. However, while each master data coordinate indicates whether its corresponding business object node field is mandatory for the business process, the instance coordinates for each business object indicate that status of master data in the corresponding business object node field. In one implementation, the instance coordinates can also be binary, having values of 0 or 1 where 1 indicates a valid master data is present in the business object node field and 0 indicates that valid master data is not present in the business object node field. In the example given above for business process $bp_1$ having master data vector $\vec{m}_1(bp_1)$, the instance vectors $\vec{I}_1$, $\vec{I}_2$, $\vec{I}_3$, and $\vec{I}_4$ for four business objects numbered 1 through 4 can be as follows:

$$\vec{I}_1 = (0,0,0) \quad (4)$$

$$\vec{I}_2 = (1,1,1) \quad (5)$$

$$\vec{I}_3 = (0,1,0) \quad (6)$$

$$\vec{I}_4 = (0,1,1) \quad (7)$$

In this case, business object 1 includes valid master data in none of the business object node fields covered by the master data vector $\vec{m}_1(bp_1)$ and business object 2 includes valid master data in all of the business object node fields covered by the master data vector $\vec{m}_1(bp_1)$. Business object 3 includes valid master data only in the "customer root category code" business object node field and business object 4 includes valid master data in the "customer root category code" and "customer root status" business object node fields.

At 310, the business process is analyzed using at least one of the master data instance vectors and the business process master data vector. In one implementation, the analysis can include assessing master data consistency for the business process by determining that a fraction of the plurality of business objects contain sufficient valid master data to run the business process. In mathematical terms, this analysis can include calculating a master data consistency factor, $C(bp_1)$ for the business process by comparing the master data instance vectors with the business process master data vector to identify a first number, $N_{match}$, of master data instance vectors having instance coordinates matching the master data coordinates indicating mandatory master data. The master data consistency factor, $C(bp_1)$ can then be calculated as $$C(bp_1) = \frac{N_{match}}{N_{total}} \quad (8)$$

where $N_{total}$ is a total number of master data instance vectors which is equal to the total number of business subjects used in the business process. In the example illustrated above in equations (3) through (7), the master data consistency factor, $C(bp_1)$ would be 0.50 because half of the instance vectors (those corresponding to business objects 2 and 4) match the requirements specified in the master data vector $\vec{m}_1(bp_1)$.

In further implementations, the master data consistency factor, $C(bp_i)$, of a business process of an organization can be used to get an overview about the master data quality and the number of business processes which can be performed on the actual set of master data. It is also possible to obtain an overview about the number of business processes of the organization that would run consistently when using the actual master data set of the company. In one implementation, an alert or other notification can be delivered to a user, for example via a user interface, if the master data consistency factor, $C(bp_i)$, of a business process is below a threshold. For example, if $C(bp_i)$ is less than 0.80, a notification can be sent. The master data consistency factor, $C(bp_i)$, can also be used as an operative metric such that a business process is not executed unless $C(bp_i)$ exceeds a predetermined threshold. In an alternative or additional implementation, master data consistency factors can be calculated for all of the business processes of the organization. Using the threshold for master data consistency, a metric of the total number of business processes that can be run using the current state of the organization's master data can also be calculated.

In further implementations, the consistency of master data of business processes in an organization can be recorded over the time and be used as a time series analysis to chart or track master data quality as a function of time. For example, data entry or data collection personnel in the organization can be scored or otherwise incentivized to improve the organization's master data quality by tracking the quality as a function of time. In some variations, a simple key performance indicator can be defined as $$C(bp_i, t) \geq T_i, \quad (10)$$

where $T_i$ is a threshold for a concrete business process master data consistency. A time derivative of this indicator can be used to measure progress toward improving master data quality over time:

$$C(bp_i, \Delta t) \geqq -\Delta T_i, \quad (11)$$

where $\Delta T_i$ is the difference between $T_i$ at a first time, $t_1$, and a later time, $t_2$ where $t_2 = t_1 + \Delta t$. As expressed in equation (11), over the time period, $\Delta t$, a positive value for the change in $T_i$ for a given business process master data set indicates that the quality of the business process master data is increasing over time. This is the preferred result of entry of master data values. If the change in $T_i$ is negative, then the quality of the business process master data is decreasing with time. The calculation of indicators such as those described herein can be made in real time within the system and can be used for an online quality determination. If the master data quality is decreasing with time, an alert can be provided to an administrator or supervisor so that corrective action can be taken or so that master data entry or updating processes can be examined and/or improved if necessary.

The consistency factor of the existing instances of the organization's master data can be used to derive operative performance indicators. In some implementations, the derived performance values such as the master data consistency for a given business process or the overall master data consistency across all business processes or for a subset of important business processes can be visualized in real time. In one implementation, one or more of these metrics can be displayed to data entry or data collection personnel in real time in a user interface to provide direct feedback during entry or modification of master data.

Generally, new master data in an organization's system can be created in at least two ways: automatically by application-to-application communication via interfaces, such as for example business to business (B2B) messaging, and manually by a human-to-application communication, such as for example via a user interfaces like an Internet browser. For the case of manual entry, including but not limited to creation or modification of master data, attributes pertaining to master data, or the like, the current subject matter can be employed in a real time or near real time application that monitors and provides reporting (for example by displaying relevant information via the user interface) regarding consistency of a concrete master data instance. The master data instance consistency can be shown in relation to one particular business process, a group of business processes, or all business processes in the organization. Results of real time or near real time analyses regarding which business processes can successfully be run in the organization based on the current set of master data can be provided in some implementations. Such information can also be displayed in the user interface as feedback for a user, for example a worker handling data entry or modification, a supervisor, or any other interested party with authorized access to such analyses. The number of references of a mandatory field in given business process can also be used for a ranking to express the importance of a master data field.

Business process similarity analyses can also be performed according to implementations of the current subject matter. In one example, the scalar product or the cosines of the scalar products of two or more master data vectors can be used to examine the similarities of related business processes. For example, a second master data vector can be defined for a second business process of the organization that involves a second plurality of business objects. The second master data coordinates of the second master data vector can be assigned values indicating whether the business object node fields to which they correspond are or are not mandatory for successful execution of the second business process. Second master data instance vectors corresponding to the second plurality of business objects can be evaluated such that each second master data instance vector includes second instance coordinates corresponding to the business object node fields in a corresponding business object of the second plurality of business objects and to the second master data coordinates in the second business process master data vector. Each second instance coordinate indicates whether its corresponding second business object node field contains a master data value.

A scalar product can be determined between the business process master data vector, $\vec{m}(bp_1)$, of the first business process and a second business process master data vector, $\vec{m}(bp_2)$, of the second business process. The scalar product, $|s|^2$, for the two vectors is $$|s|^2 = |\vec{m}(bp_1)| \cdot |\vec{m}(bp_2)| \cdot \cos \alpha \quad (12)$$

where $\alpha$ is an angle between the first business process master data vector and the second business process master data vector. A similarity metric can be set equal to the cosine of $\alpha$, $\cos \alpha$, to reflect a similarity between the first business process and the second business process. In an alternative implementation, the scalar product can also be expressed in the coordinates of the vectors $$|s|^2 = \sum_i m_{1,i} \cdot m_{2,i}. \quad (13)$$

If the scalar product is zero then the two vectors, $\vec{m}(bp_1)$ and $\vec{m}(bp_2)$, are independent or orthogonal. In addition, the $\cos \alpha$ calculated by the scalar product is a quantitative indicator for the similarity of two master data vectors assigned to specific business processes. If the $\cos \alpha = 0$, then the two master data vectors, $\vec{m}(bp_1)$ and $\vec{m}(bp_2)$, are independent and have no similarity If the $\cos \alpha = 1$ then the two master data vectors, $\vec{m}(bp_1)$ and $\vec{m}(bp_2)$, are identical due to the fact that only 0 and 1 are allowed values for the coordinates of the master data vectors. In this case, the two business processes, $bp_1$ and $bp_2$, use the same master data. Information of this type can be used in a synergy analysis to optimize business processes across an organization. For example, if two business processes are very similar, there is a high probability that the user interfaces and the B2B messages should look and feel similar. Similar user interfaces reduces the amount of learning to use these user interfaces.

As an illustrative example of similarity analysis, a hypothetical organization has three master data vectors for three business processes:

$$\vec{m}(bp_1) = (0,1,1) \quad (14)$$

$$\vec{m}(bp_2) = (1,0,0) \quad (15)$$

$$\vec{m}(bp_3) = (0,1,1) \quad (16)$$

The scalar products of these master data vectors are as follows:

$$\vec{m}(bp_1) \cdot \vec{m}(bp_2) = 0+0+0 = 0 \quad (17)$$

$$\vec{m}(bp_1) \cdot \vec{m}(bp_3) = 0+1+1 = 2 \quad (18)$$

Based on this calculation the business processes $bp_1$ and $bp_2$ are orthogonal and independent regarding their master data usage. On the other hand, the business processes $bp_1$ and $bp_3$ are similar. The similarity metric, $\cos \alpha$, is as follows:

$$\cos \alpha = \frac{\vec{m}(bp_1) \cdot \vec{m}(bp_3)}{|\vec{m}(bp_1)| \cdot |\vec{m}(bp_3)|} = \frac{2}{\sqrt{2} \cdot \sqrt{2}} = 1.0. \qquad (19)$$

The calculation in equation (19) shows that the two business processes, $bp_1$ and $bp_3$, are identical regarding their usage of master data. Taking the example a step further, the organization includes a fourth master data vector for a fourth business process:

$$\vec{m}(bp_4) = (1,1,1) \qquad (20)$$

Calculating the similarity metric between the business processes, $bp_1$ and $bp_4$, in a manner similar to that shown in equation (19) gives $\cos \alpha = 0.816$ which indicates that the master data usage of the two business processes is not identical, but nonetheless has a high similarity.

Figure 4:
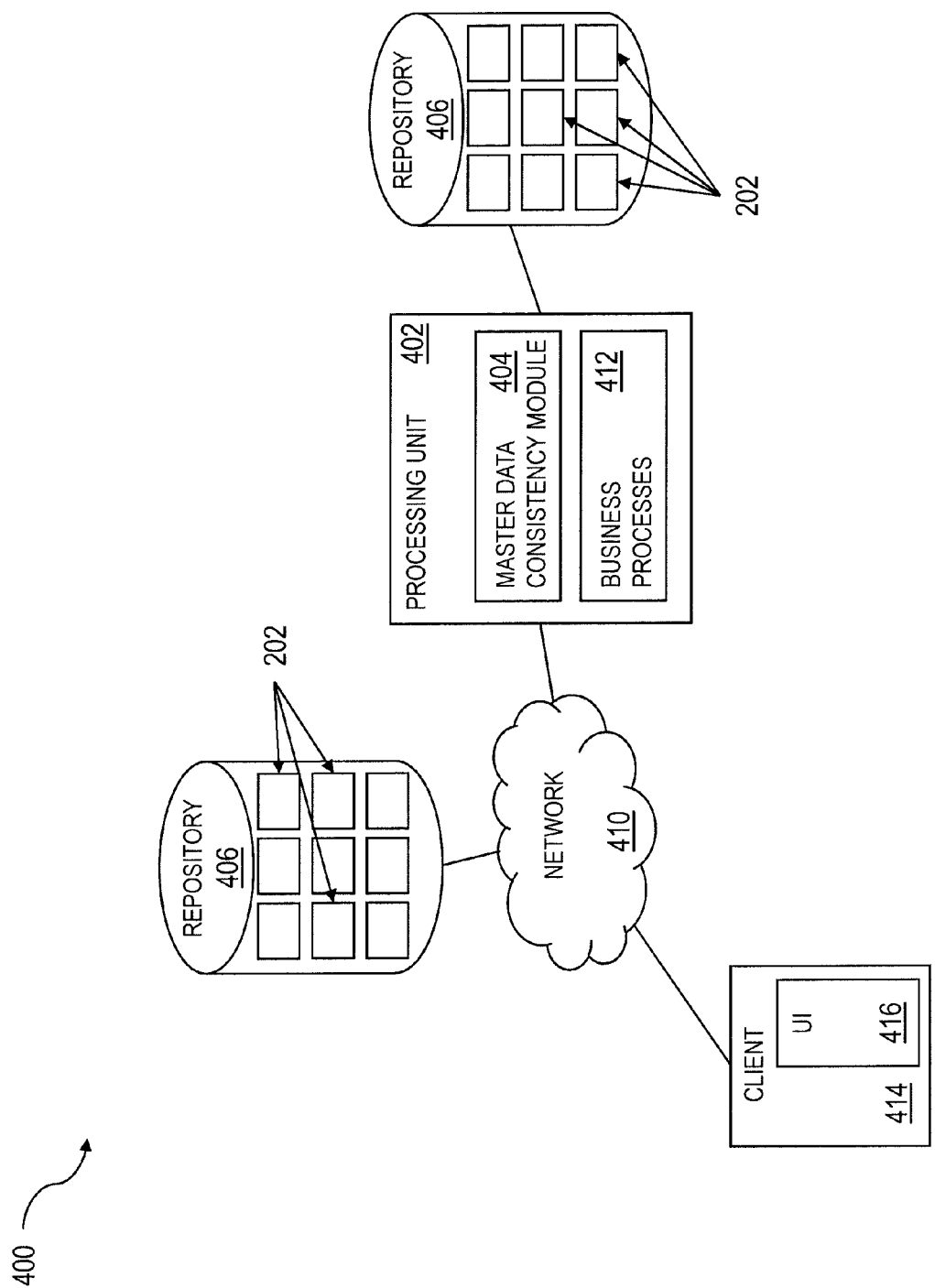
FIG. 4 is a schematic diagram illustrating a system.

In a further implementation of the current subject matter, a system for analyzing master data consistency can be provided. FIG. 4 shows a diagram 400 of such a system. A processing unit 402, that can include one or more processors, programmable machines, computers, or the like, includes a master data consistency module 404. The processing unit 402 can be in communication with one or more repositories 406, that can be part of the processing unit or accessible over a network 410 that can be a local or wide area network, an organization's intranet, the Internet, or the like. The repositories 406 contain business objects 202 that are involved in the execution of business processes 412 by the processing unit 402 or by other machines within the organization. The master data consistency module 404 can perform one or more of the functions discussed above. A user can access the master data consistency module 404, either locally or over a network 410 via a client machine 414 with a user interface 416. Data input, updating, or other modification can be performed via a user interface 416 at a client machine. In some implementations, the master data consistency module 404 can monitor master data consistency using master data and instance vectors for one or more business processes 412 of the organization. This monitoring can be done periodically, in real time, etc. For real time monitoring, the master data consistency module 404 can generate real time feedback to be displayed at the user interface 416 to indicate the effects of data additions or modifications on master data consistency. A user can also be prompted, for example when accessing one or more data objects from a repository 406, to perform a task that could improve the master data consistency or quality. For example, if the user interface 416 is one displayed to a cal center employee who has daily contact with customers of the organization, the user interface 416 can be configured to prompt the employee to request that the customer verify the quality of the master data in one or more contact data fields. A user interface 416 displayed to a supervisor can include information on how supervises of the supervisor have performed in collecting and improving master data quality and consistency.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example a data server, or that includes a middleware component, such as for example an application server, or that includes a front-end component, such as for example a client computer having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. Other implementations may be within the scope of the following claims.

The invention claimed is:

1. A computer-implemented method comprising:

defining a business process master data vector for a business process, the business process master data vector comprising master data coordinates corresponding to business object node fields of a plurality of business objects involved in the specific business process;

assigning a value to each master data coordinate to indicate whether its corresponding business object node field is mandatory for successful execution of the business process;

evaluating a plurality of master data instance vectors corresponding to the plurality of business objects, each master data instance vector comprising instance coordinates corresponding to the business object node fields in a corresponding business object of the plurality of business objects and to the master data coordinates in the business process master data vector, each instance coordinate indicating whether its corresponding business object node field contains a master data value; and analyzing the business process using at least one of the business process master data vector and the master data instance vectors, the analyzing of the business process comprising assessing master data consistency for the business process by determining that a fraction of the plurality of business objects contain sufficient master data to run the business process;

wherein the analyzing the business process comprises:
determining a scalar product between the business process master data vector, $\vec{m}(bp_1)$, of the business process and a second business process master data vector, $\vec{m}(bp_2)$, of a second business process, the scalar product, $|s|^2$, being calculated in accordance with the following:

$$|s|^2 = |\vec{m}(bp_1)| \cdot |\vec{m}(bp_2)| \cdot \cos \alpha;$$

wherein $\alpha$ is an angle between the business process master data vector and the second business process master data vector; and calculating a similarity metric equal to $\cos \alpha$ that reflects a similarity between the business process and the second business process, and wherein the defining, the assigning, the evaluating, and the analyzing are performed by a system comprising at least one programmable processor.

2. A computer-implemented method comprising:

defining a business process master data vector for a business process, the business process master data vector comprising master data coordinates corresponding to business object node fields of a plurality of business objects involved in the specific business process;

assigning a value to each master data coordinate to indicate whether its corresponding business object node field is mandatory for successful execution of the business process;

evaluating a plurality of master data instance vectors corresponding to the plurality of business objects, each master data instance vector comprising instance coordinates corresponding to the business object node fields in a corresponding business object of the plurality of business objects and to the master data coordinates in the business process master data vector, each instance coordinate indicating whether its corresponding business object node field contains a master data value; and analyzing the business process using at least one of the business process master data vector and the master data instance vectors, the analyzing of the business process comprising assessing master data consistency for the business process by determining that a fraction of the plurality of business objects contain sufficient master data to run the business process;

wherein the defining, the assigning, the evaluating, and the analyzing are performed by a system comprising at least one programmable processor, and wherein the determining of the fraction comprises:
comparing the master data instance vectors with the business process master data vector to identify a first number, $N_{match}$, of master data instance vectors having instance coordinates matching the master data coordinates indicating mandatory master data; and calculating the master data consistency for the business process, $C(bp_1)$, in accordance with the following:

$$C(bp_1) = \frac{N_{match}}{N_{total}};$$

wherein $N_{total}$ is a total number of master data instance vectors.

3. A computer-implemented method as in claim 2, further comprising providing a feedback indicator to a user interface if $C(bp_1)$ is less than a predetermined consistency threshold.

4. A computer-implemented method as in claim 2, further comprising executing the business process only if $C(bp_1)$ is greater than a predetermined consistency threshold.

5. A computer-implemented method as in claim 2, further comprising:

receiving, via a user interface, an update to master data in the plurality of business objects; and providing feedback via the user interface in real time to indicate how the update affects the master data consistency.

6. A computer-implemented method as in claim 2, further comprising:

evaluating, for a second business process, a second plurality of master data instance vectors corresponding to a second plurality of business objects involved in the second business process, each second master data instance vector comprising second instance coordinates corresponding to second business object node fields in a corresponding second business object of the second plurality of business objects and to second master data coordinates in a second business process master data vector, each second instance coordinate indicating whether its corresponding second business object node field contains a second master data value;

assessing master data consistency for the second business process by determining that a second fraction of the second plurality of business objects contain sufficient master data to run the second business process; and calculating a metric indicating a total fraction of the business processes of the organization have sufficient master data consistency to be executed.

7. A system comprising:
at least one data repository stored on at least one system comprising a computer-readable storage medium, the at least one data repository comprising a plurality of business objects each comprising business object node fields comprising master data, the plurality of business objects being involved in execution of a business process of the organization;
at least one processor that implements a master data consistency module that performs operations comprising:
defining a business process master data vector for the business process, the business process master data vector comprising master data coordinates corresponding to business object node fields of the plurality of business objects;
assigning a value to each master data coordinate to indicate whether its corresponding business object node field is mandatory for successful execution of the business process;
evaluating a plurality of master data instance vectors corresponding to the plurality of business objects, each master data instance vector comprising instance coordinates corresponding to the business object node fields in a corresponding business object of the plurality of business objects and to the master data coordinates in the business process master data vector, each instance coordinate indicating whether its corresponding business object node field contains a master data value; and
analyzing the business process using at least one of the business process master data vector and the master data instance vectors, the analyzing of the business process comprising assessing master data consistency for the business process by determining that a fraction of the plurality of business objects contain sufficient master data to run the business process,
wherein the analyzing the business process comprises:
determining a scalar product between the business process master data vector, $\vec{m}(bp_1)$, of the business process and a second business process master data vector, $\vec{m}(bp_2)$, of a second business process, the scalar product, $|s|^2$, being calculated in accordance with the following:

$$|s|^2 = |\vec{m}(bp_1)| \cdot |\vec{m}(bp_2)| \cdot \cos \alpha;$$

wherein $\alpha$ is an angle between the business process master data vector and the second business process master data vector; and
calculating a similarity metric equal to $\cos \alpha$ that reflects a similarity between the business process and the second business process.

8. A system comprising:
at least one data repository stored on at least one system comprising a computer-readable storage medium, the at least one data repository comprising a plurality of business objects each comprising business object node fields comprising master data, the plurality of business objects being involved in execution of a business process of the organization;
at least one processor that implements a master data consistency module that performs operations comprising:
defining a business process master data vector for the business process, the business process master data vector comprising master data coordinates corresponding to business object node fields of the plurality of business objects;
assigning a value to each master data coordinate to indicate whether its corresponding business object node field is mandatory for successful execution of the business process;
evaluating a plurality of master data instance vectors corresponding to the plurality of business objects, each master data instance vector comprising instance coordinates corresponding to the business object node fields in a corresponding business object of the plurality of business objects and to the master data coordinates in the business process master data vector, each instance coordinate indicating whether its corresponding business object node field contains a master data value; and
analyzing the business process using at least one of the business process master data vector and the master data instance vectors, the analyzing of the business process comprising assessing master data consistency for the business process by determining that a fraction of the plurality of business objects contain sufficient master data to run the business process,
wherein the determining of the fraction comprises:
comparing the master data instance vectors with the business process master data vector to identify a first number, $N_{match}$, of master data instance vectors having instance coordinates matching the master data coordinates indicating mandatory master data; and
calculating the master data consistency for the business process, $C(bp_1)$, in accordance with the following:

$$C(bp_1) = \frac{N_{match}}{N_{total}};$$

wherein $N_{total}$ is a total number of master data instance vectors.

9. A system as in claim 8, wherein the operations performed by the master data consistency module further comprise providing a feedback indicator to a user interface at a client machine if $C(bp_1)$ is less than a predetermined consistency threshold.

10. A system as in claim 8, wherein the operations performed by the master data consistency module further comprise executing the business process only if $C(bp_1)$ is greater than a predetermined consistency threshold.

11. A system as in claim 8, wherein the operations performed by the master data consistency module further comprise:
receiving, via a user interface at a client machine, an update to at least one of the plurality of business objects stored in the at least one repository; and
providing feedback via the user interface in real time to indicate how the update affects the master data consistency for the business process.

12. A non-transitory computer-readable medium storing instructions that, when executed by at least one processor, cause the at least one processor to perform operations comprising:
defining a business process master data vector for a business process, the business process master data vector comprising master data coordinates corresponding to business object node fields of a plurality of business objects involved in the business process;

assigning a value to each master data coordinate to indicate whether its corresponding business object node field is mandatory for successful execution of the business process;

evaluating a plurality of master data instance vectors corresponding to the plurality of business objects, each master data instance vector comprising instance coordinates corresponding to the business object node fields in a corresponding business object of the plurality of business objects and to the master data coordinates in the business process master data vector, each instance coordinate indicating whether its corresponding business object node field contains a master data value; and analyzing the business process using at least one of the business process master data vector and the master data instance vectors, the analyzing of the business process comprising assessing master data consistency for the business process by determining that a fraction of the plurality of business objects contain sufficient master data to run the business process, wherein the analyzing the business process comprises:

determining a scalar product between the business process master data vector, $\vec{m}(bp_1)$, of the business process and a second business process master data vector, $\vec{m}(bp_2)$, of a second business process, the scalar product, $|s|^2$, being calculated in accordance with the following:

$$|s|^2 = |\vec{m}(bp_1)| \cdot |\vec{m}(bp_2)| \cdot \cos \alpha;$$

wherein $\alpha$ is an angle between the business process master data vector and the second business process master data vector; and calculating a similarity metric equal to $\cos \alpha$ a that reflects a similarity between the business process and the second business process.

13. A non-transitory computer-readable medium storing instructions that, when executed by at least one processor, cause the at least one processor to perform comrising:

defining a business process master data vector for a business process, the business rocess master data vector com risin master data coordinates corres ondin to business ob ect node fields of a plurality of business objects involved in the business process;

assigning a value to each master data coordinate to indicate whether its corresponding business object node field is mandatory for successful execution of the business process;

evaluating a plurality of master data instance vectors corresponding to the plurality of business objects, each master data instance vector comprising instance coordinates corresponding to the business object node fields in a corresponding business object of the plurality of business objects and to the master data coordinates in the business process master data vector, each instance coordinate indicating whether its corresponding business object node field contains a master data value; and analyzing the business process using at least one of the business process master data vector and the master data instance vectors, the analyzing of the business process comprising assessing master data consistency for the business process by determining that a fraction of the plurality of business objects contain sufficient master data to run the business process, wherein the determining of the fraction comprises:

comparing the master data instance vectors with the business process master data vector to identify a first number, $N_{match}$, of master data instance vectors having instance coordinates matching the master data coordinates indicating mandatory master data; and calculating the master data consistency for the business process, $C(bp_1)$, in accordance with the following:

$$C(bp_1) = \frac{N_{match}}{N_{total}};$$

wherein $N_{total}$ is a total number of master data instance vectors.

14. A non-transitory computer-readable medium as in claim 13, wherein the operations further comprise providing a feedback indicator to a user if $C(bp_1)$ is less than a predetermined consistency threshold.

15. A non-transitory computer-readable medium as in claim 13, further comprising providing a feedback indicator to a user interface if $C(bp_1)$ is less than a predetermined consistency threshold.

16. A non-transitory computer-readable medium as in claim 13, further comprising executing the business process only if $C(bp_1)$ is greater than a predetermined consistency threshold.

17. A non-transitory computer-readable medium as in claim 13, further comprising:

receiving, via a user interface, an update to master data in the plurality of business objects; and providing feedback via the user interface in real time to indicate how the update affects the master data consistency.

18. A non-transitory computer-readable medium as in claim 13, further comprising:

evaluating, for a second business process, a second plurality of master data instance vectors corresponding to a second plurality of business objects involved in the second business process, each second master data instance vector comprising second instance coordinates corresponding to second business object node fields in a corresponding second business object of the second plurality of business objects and to second master data coordinates in a second business process master data vector, each second instance coordinate indicating whether its corresponding second business object node field contains a second master data value;

assessing master data consistency for the second business process by determining that a second fraction of the second plurality of business objects contain sufficient master data to run the second business process; and calculating a metric indicating a total fraction of the business processes of the organization have sufficient master data consistency to be executed.

* * * * *